United States Patent [19]

Allon

[11] Patent Number: 4,735,474

[45] Date of Patent: Apr. 5, 1988

[54] PHOTOGRAPH BOOTH WITH AUTOMATIC HOLOGRAPHIC CAMERA

[75] Inventor: Gerard Allon, Montreal, Canada

[73] Assignee: Trilone Holographie Corp., Montreal, Canada

[21] Appl. No.: 21,755

[22] Filed: Mar. 4, 1987

[51] Int. Cl.⁴ ............................................... G03H 1/04
[52] U.S. Cl. ...................................... 350/3.6; 350/3.8
[58] Field of Search .................... 350/3.6, 3.8, 3.83, 350/3.84; 355/27, 28

[56] References Cited

U.S. PATENT DOCUMENTS

| | | |
|---|---|---|
| 3,526,444 | 9/1970 | Carcel et al. |
| 3,529,883 | 9/1970 | Wuerker et al. |
| 3,556,631 | 1/1971 | Cook |
| 3,644,013 | 2/1972 | Gould |
| 3,758,186 | 9/1973 | Brumm |
| 3,802,758 | 4/1974 | Havener et al. |
| 3,837,726 | 9/1974 | Suzuki et al. |
| 3,848,096 | 10/1974 | Marko |
| 4,094,575 | 6/1978 | Kellie |
| 4,329,409 | 5/1982 | Wreede et al. |
| 4,474,421 | 10/1984 | Nicholson ............................ 350/3.6 |
| 4,598,973 | 7/1986 | Greenleaf |

Primary Examiner—Bruce Y. Arnold
Assistant Examiner—Martin Lerner
Attorney, Agent, or Firm—Swabey, Mitchell, Houle, Marcoux & Sher

[57] ABSTRACT

A photograph booth for providing a hologram of a human subject positioned inside the booth in facing relationship to a holographic sheet film on which the hologram of the subject is to be recorded. The booth comprises a Q-switched laser source for generating a pulsed laser beam having a coherence length of at least about one meter and a pulse duration of about 20 to about 100b nanoseconds, and a sheet film holder for supporting the holographic sheet film in a plane facing the subject. The booth according to the invention further includes a white light source operable prior to activation of the laser source for illuminating the subject with white light of sufficient intensity and over a sufficient period of time to cause pupil contraction to a size permitting safe illumination of the subject by the diverged object beam, and a film processing unit for developing the exposed film having the holographic interference pattern recorded thereon to provide a hologram representative of the human subject and viewable directly in white light.

30 Claims, 2 Drawing Sheets

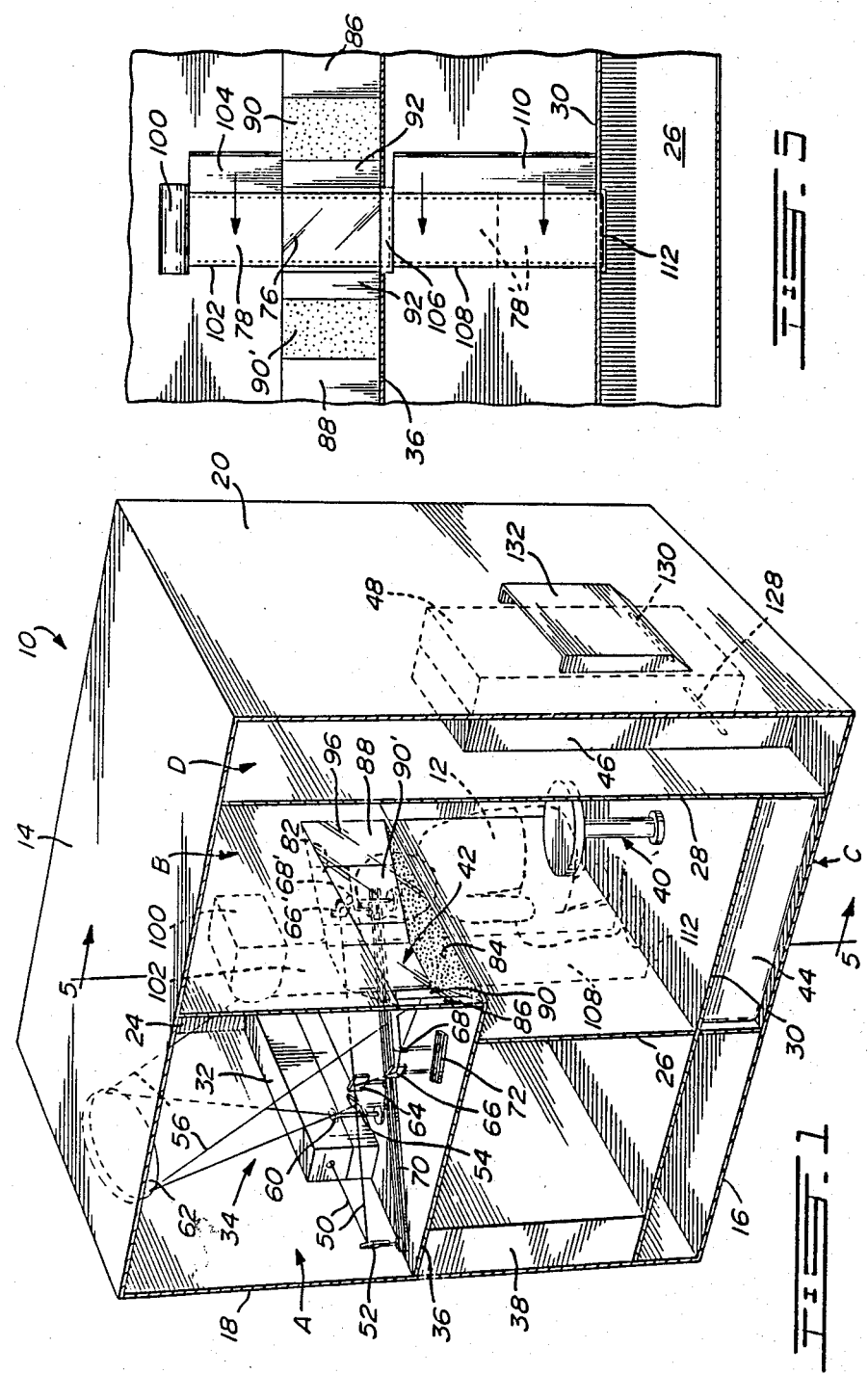

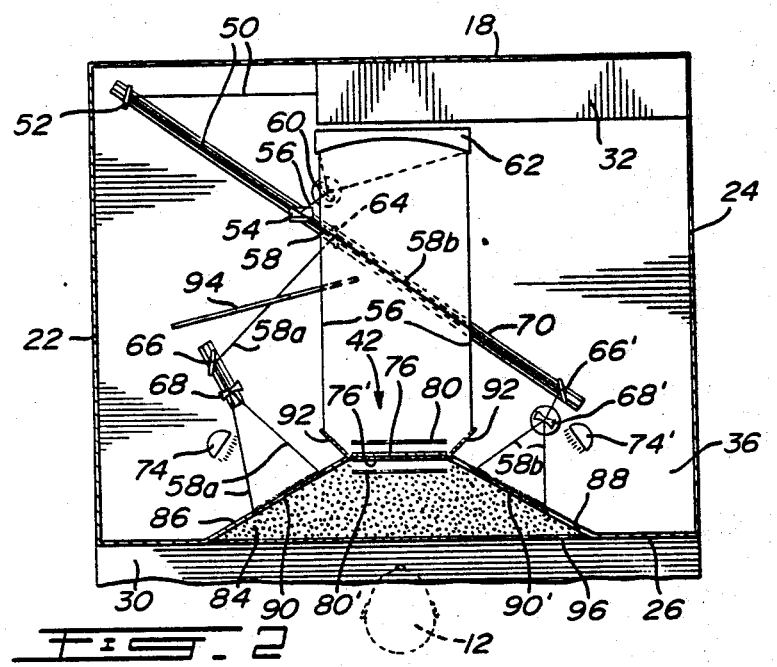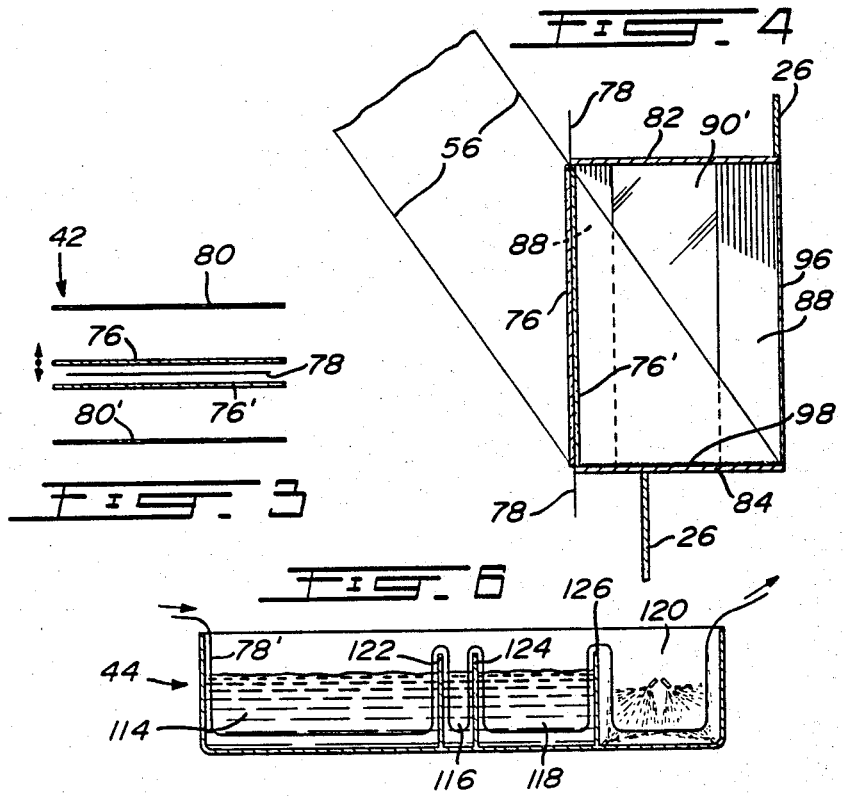

PHOTOGRAPH BOOTH WITH AUTOMATIC HOLOGRAPHIC CAMERA

BACKGROUND OF THE INVENTION

The present invention relates to improvements in the field of holography. More particularly, the invention is directed to a method of taking holographic portraits of human subjects, as well as to a photograph booth for providing a hologram of a human subject positioned inside the booth.

A hologram is an interference pattern which is produced by the interference of a reference beam with light reflected from or transmitted through an object, and which can be recorded as such on a photographic emulsion. This interference pattern on the holographic film should not move during the exposure time; otherwise, a poor or ruined hologram will result. This requires that all components of the holographic apparatus remain stationary to a fraction of a wavelength during the exposure time. Thus, when making holograms with continuous wave gas lasers, which require an exposure time of about a second, use has to be made of massive stabilized tables. Therefore, it has been impossible up till the 1970's to make holograms of objects which could not be displaced and brought to a holographic studio, as well as holograms of moving objects.

Portable holographic cameras have been designed with a view to overcoming the above drawbacks. An example of such a camera is described in U.S. Pat. No. 3,837,726 of Sept. 24, 1974. In this holographic camera, in order to be able to vary the coherent range within which the object can be placed to be recorded on the hologram, a rather complex optical system is provided for varying the optical path length of the object beam or the reference beam. The camera includes a range finder having a rotatable mirror which is rotated to determine the distance from the camera to the object. The rotatable mirror is associated with the optical system for varying the optical path length of the object beam or reference beam so that the optical path length of either beam may be varied according to the distance measured by the range finder in such a way as to make the optical path length of the reference beam equal to that of the object beam. Due to its complexity, the optical system of such a camera is thus prone to malfunction and the camera may therefore present potential hazards to persons when taking holographic portraits of human subjects.

Pulsed laser holocameras for recording action scenes, or the other hand, are known, for example from U.S. Pat. No. 3,529,883 of Sept. 22, 1970. However, the holographic camera described in this patent is essentially limited to transmitted-beam type holograms, that is, holograms made with an object beam transmitted through the object to be recorded on the hologram. Although such a holographic camera is suitable for recording transmission holograms of moving objects, the object must necessarily be transparent or translucid for permitting transmission of the object beam therethrough. Accordingly, it is impossible to take holographic portraits of human subjects.

With respect to safety, it is extremely difficult to safely apply pulse laser holography to making holograms of living people due to the intense nature of pulsed laser radiation. This is particularly true in the case of reflection holograms, where the reference beam illuminates the holographic film from the side opposite the subject. Since reference beam light transmitted through the holographic film in a direction toward the subject and may accidentally be viewed by the latter, a danger zone is created between the holographic film and the subject. In this danger zone, the energy density may be as high as 180 times the threshold for biological damage by laser radiation at the retina of the eye, and may thus cause permanent eye damage.

SUMMARY OF THE INVENTION

It is therefore an object of the present invention to overcome the above drawbacks and to provide a method of safety taking holographic portraits of human subjects, using pulsed laser radiation.

It is a further object of the invention to provide a photograph booth for making a hologram of a human subject positioned inside the booth, in a safe and entirely automatic manner.

According to a broad aspect of the invention, there is thus provided a method of taking a holographic portrait of a human subject, comprising the steps of:

(a) illuminating the subject with white light of sufficient intensity and over a sufficient period of time to cause pupil contraction to a size permitting safe illumination of the subject by pulsed laser radiation;

(b) activating a Q-switched laser source to generate a pulsed laser beam having a coherence length of at least about one meter and a pulse duration of about 20 to about 100 nanoseconds;

(c) dividing the laser beam into a reference beam and at lest one object beam;

(d) diverging and guiding the reference beam toward a holographic film supported in a plane facing the subject;

(e) diverging and guiding the at least one object beam toward the subject for illuminating same at an acute angle of incidence such as to cause light reflected by the subject onto the film to interfere with the diverged reference beam and thereby produce a holographic interference pattern; and (f) exposing the film to the holographic interference pattern for a predetermined exposure time to record thereon the holographic interference pattern while substantially preventing stray light from reaching the film.

The invention also provides, in another aspect thereof, a photograph booth for providing a hologram of a human subject positioned inside the booth in facing relationship to a holographic sheet film on which the hologram of the subject is to be recorded, which booth comprises:

a Q-switched laser source for generating a pulsed laser beam travelling along an optical path, the pulsed laser beam having a coherence length of at least about one meter and a pulse duration of about 20 to about 100 nanoseconds;

beam splitting means arranged in the optical path of the laser beam for dividing the laser beam into a reference beam and at least one object beam;

sheet film holding means for supporting the holographic sheet film in a plane facing the subject;

a first optical system for diverging and guiding the reference beam toward the film;

a second optical system for diverging and guiding the at least one object beam toward the subject for illuminating same at an acute angle of incidence such as to cause light reflected by the subject onto the film to interfere with the diverged reference beam and thereby produce a holographic interference pattern;

white light source means operable prior to activation of the laser source for illuminating the subject with white light of sufficient intensity and over a sufficient period of time to cause pupil contraction to a size permitting safe illumination of the subject by the diverged object beam;

shutter means synchronized with the laser source for exposing the film to the holographic interference pattern for a predetermined exposure time to record thereon the holographic interference pattern while substantially preventing stray light from reaching the film; and film processing means for developing the exposed film having the holographic interference pattern recorded thereon to provide a hologram representative of the human subject and viewable directly in white light.

Applicant has found quite unexpectedly that by stimulating the iris of the subject's eyes with white light of sufficient intensity and over a sufficient period of time to cause the pupil to contract to a size permitting safe illumination of the subject by pulsed laser radiation, typically 3-mm pupil, possible eye damage can be avoided. Directing the diverged object beam onto the subject at an acute angle of incidence further contributes to minimizing eye damage.

The laser source advantageously utilized is a Q-switched ruby laser operative to generate a pulsed laser beam having a coherence lengt of about one meter and a pulse duration of about 30 nanoseconds so as to essentially freeze all motion. The optical components of the first and second optical systems are preferably adjusted such that the reference and object beams have equal optical path lengths when the subject is positioned at a distance of about 30 cm from the film; since a pulsed laser beam with a coherent length of about 1 meter is used, any departure from that distance as a result of the subject being positioned closer to or further away from the film will therefore be compensated by the coherence length of the laser beam so that a holographic interference pattern will still be formed. A pulsed laser beam having a pulse energy of about 0.5 joule is generally sufficient to providing the desired holograms.

According to a particularly preferred embodiment of the invention, the first and second optical systems are arranged to cause the diverged reference beam and the light reflected from the subject to impinge on opposite sides of the film. This arrangement enables to make one-step white light reflection holograms, that is, holograms which can be reconstructed directly in white light and viewed by reflected white light at angle of view up to 180°.

A partition wall formed with an opening advantageously separates the booth into first and second contiguous compartments with the subject positioned in the second compartment, and filmholder mounting means are provided for mounting the film holding means in spaced relation tot he wall and in alignment with the opening thereof such that the mounting means together with the film holding means define a recess relative to the second compartment. Preferably, the film holding means comprises first and second clamping plates of transparent material extending in opposite parallel relationship to one another for holding the film clamped therebetween, the first clamping plate receiving therethrough the diverged reference beam for transmission to the film. The second clamping plate may be fixed and the first clamping plate movable thereto between a film engaging position whereat the first clamping plate is moved toward the second clamping plate to hold the film thereagainst for exposure to the holographic interference pattern, and a film releasing position whereat the first clamping plate is moved away from the second clamping plate to release the film after exposure, plate actuating means being provided for moving the first clamping plate between the film engaging and releasing positions.

According to another preferred embodiment, the laser beam is polarized in a plane perpenticular to the plane of the film and the diverged reference beam is caused to impinge upon the first clamping plate at an angle of incidence substantially equal to Brewster angle, typically 55°, for example by being reflected downwardly onto the first clamping plate at such an angle of incidence. This prevents the reference beam transmitted through the first clamping plate from producing a glare at the surface of the second clamping plate facing the first clamping plate, which may fog the film. Also, by directing the diverged reference beam downwardly at a steep angle onto the first clamping plate, reference light will be transmitted through the clamping plates and the film interposed therebetween in a direction away from the subject's face, thereby further minimizing possible eye damage.

In a preferred embodiment, the filmholder mounting means comprise a pair of upper and lower mounting elements and a pair of lateral mounting elements, the mounting elements extending from the partition wall into the first compartment and interconnecting the second clamping plate respectively along upper, lower and side edges thereof with the wall. The lower mounting element is provided with a light absorbing upper surface dimensioned to substantially completely absorb the diverged reference beam passing through the clamping plates and the film interposed therebetween. In this manner, reference light will be prevented from being transmitted into the second compartment where the subject is located, thereby eliminating any danger zone in that compartment.

According to still another preferred embodiment, the lateral mounting elements are each provided with a light diffusing screen extending at an oblique angle relative to the second clamping plate, and the beam splitting means comprises a first beamsplitter for dividing the laser beam into reference and object beams and a second beamsplitter for dividing the object beam into first and second object beam portions, the first and second object beam portions being diverged and guided by the second optical system to pass through the diffusing screens for illuminating the subject with diffuse light. This further contributes to minimizing possible eye damage.

The white light source means advantageously comprise a pair of high intensity lamps such as halogen lamps arranged to direct a beam of white light through the diffusing screens. These lamps are preferably turned on for a period of about 30 seconds prior to activation of the laser source, in order to allow the pupils of the subject's eyes to respond to the light stimulus and to sufficiently contract, thereby permitting safe illumination of the subject by pulsed laser radiation.

Owing to the provision of high intensity white light source means for causing pupil contraction prior to activation of the laser source, advantageously combined with object light diffusing means for illuminating the subject with diffuse object light and reference light absorbing means for preventing reference light from being transmitted into the second compartment, the invention enables holographic portraits of human subjects to be safely taken with pulsed laser radiation.

BRIEF DESCRIPTION OF THE DRAWINGS

Further features and advantages of the invention will become more readily apparent from the following description of preferred embodiments as illustrated by way of example in the accompanying drawings, in which:

FIG. 1 is a perspective view of a photograph booth according to the invention, with a side thereof sectioned;

FIG. 2 is a fragmentary top sectional view of the photograph booth shown in FIG. 1, illustrating the optical system thereof;

FIG. 3 is a schematic representation illustrating the filmholder/shutter unit of the photograph booth;

FIG. 4 is a fragmentary vertical section view showing how the diverged reference beam strikes the filmholder;

FIG. 5 which is on the same sheet of drawings as FIG. 1 is a fragmentary sectional view taken along line 5—5 of FIG. 1; and FIG. 6 is a schematic representation illustrating the film processing unit of the photograph booth.

DESCRIPTION OF PREFERRED EMBODIMENTS

Referring first to FIG. 1, there is illustrated a photograph booth with is of the moneyoperated type and is generally designated by reference numeral 10, for providing one-step white light reflection holograms of a human subject 12 positioned inside the booth. The booth 10 has top and bottom walls 14 and 16, a pair of end walls 18 and 20 as well as a pair of sidewalls 22 and 24, the sidewall 22 being shown in FIG. 2. It is separated into four compartments, namely compartments A, B, C and D, by two vertical partition walls 26 and 28 and one horizontal partition wall 30. Compartment A contains a Q-switched ruby laser 32 and the necessary optical system 34 supported on a table 36, the laser 32 being powered by the power supply 38 located underneath the table 36. Compartment B, on the other hand, defines a space in which is positioned the subject 12 whose holographic portrait is to be taken, the subject sitting on a stool 40 which is adjustable in height; the lower half of the partition wall 26 is recess relative to the upper half to provide leg and knee room for the subject 12. As shown, the subject is positioned with his face in front of a filmholder and shutter unit generally designated by reference numeral 42, in which there is provided a holographic sheet film on which the hologram of the subject 12 is to be recorded. Compartment C contains a film processing unit 44 for developing the film once exposed, whereas compartment D contains a film drying unit 46 for drying the processed film and a film laminating unit 48 for laminating the dried processed film on a black opaque support material, such as a black cardboard sheet.

As best shown in FIG. 2, the Q-switched ruby laser 32 is operative to generate a pulsed laser beam 50 which is reflected by a relay mirror 52, and the reflected laser beam is divided by a 1:1 beamsplitter 54 into an upwardly oriented reference beam 56 and an object beam 58. The reference beam 56 is diverged by means of a beamspreader 60, such as a diverging negative lens, and the diverged reference beam is collimated by a collimating mirror 62 downwardly in a direction toward the film. The object beam 58, on the other hand, is further divided by a 2:3 beamsplitter 64 into two object beam portions 58a and 58b having an intensity ratio of 2:3. The object beam portion 58a reflected from the beamsplitter 64 is reflected by an object mirror 66 in a direction towrad the subject 12, the reflected object beam 58a being diverged by means of a beamspreader 68. The object beam portion 58b transmitted through the beamsplitter 64 is similarly reflected by an object mirror 66' in a direction toward the subject 12 and the reflected object beam portion 58b is diverged by a beamspreader 68'. The relay mirror 52, beamsplitters 54 and 64 and object mirror 66' are all mounted on a rail 70 for adjustment, the mirror 66 and beamspreader 68 being likewise mounted on rail 72. A pair of halogen lamps 74 and 74' are arranged for illuminating the subject 12 with white light of high intensity prior to activation of the laser 32; the halogen lamps 74 and 74' are not shown in FIG. 1 for reason of simplicity.

As shown in FIG. 3, the filmholder and shutter unit 42 comprises a pair of clamping plates 76 and 76' of transparent material (e.g. glass) extending in opposite parallel relationship to one another for holding the holographic sheet film 78 clamped therebetween to thereby support same in a plane facing the subject, and a pair of curtain-type shutter members 80 and 80' arranged on either side of the filmholder 76,76', the shutter members 80 and 80' being synchronized with one another for synchronous opening or closing to provide a predetermined exposure time (e.g. 1/1000 sec.). The glass plate 76' is fixed whereas the glass plate 76 which is adapted to receive therethrough the collimated diverged reference beam 56 for transmission to the film 78 is movable relative to the fixed plate 76' between a film engaging position whereat the plate 76 is moved toward the plate 76' to hold the film thereagainst for exposure of the film, and a film releasing position whereat the plate 76 is moved away from the plate 76' to release the film 78 after exposure. The glass plates 76 and 76' are preferably tinted in red such as to also act as red filters allowing passage of only the wavelength of the laser light and hence minimizing stray light that may enter the system. Plate actuating means (not shown) are of course provided for moving the glass plate 76 between the film engaging and releasing positions.

The filmholder 76,76' is mounted by means of upper and lower mounting elements 82 and 84 and a pair of lateral mounting elements 86 and 88, which extend from the partition wall 26 into compartment A and interconnect the glass plate 76' respectively along upper, lower and side edges thereof with the wall 26. The filmholder 76,76' together with the mounting elements 82,84,86,88 thus define a recess relative to compartment B. As shown, the lateral mounting elements 86 and 88 are provided with ground glass diffusing screens 90 and 90' for receiving therethrough the diverged object beam portions 58a and 58b to thereby illuminate the subject 12 with diffuse object light at an acute angle of incidence. The diffusion screens 90 and 90' also receive therethrough the intense white light emitted by the halogen lamps 74 and 74' prior to activation of the laser 32. A pair of baffle members 92 are arranged along the side edges of the glass plate 76' to prevent reference light 56 from passing through the diffusion screens 90 and 90'. A similar baffle member 94 suitably apertured to allow passage of the object beam portion 58a is also provided to prevent glare produced by the relay mirror 52 and beamsplitters 54 and 64 from being recorded on the film. The baffle members 92 and 94 are not shown in FIG. 1 for reason of simplicity. A protective screen 96 of high-impact transparent material covers the wall opening defined in partition wall 26 to prevent access to the filmholder/shutter unit 42 from compartment B.

FIG. 4 illustrates how the collimated diverged reference beam 56 strikes the film 78 from behind the filmholder 76,76'. In FIG. 4, the shutter members 80 and 80' have not been represented for reason of simplicity. As shown, the collimated diverged reference beam 56 which is directed downwardly impinges on the glass plate 76 at the Brewster angle, typically about 55°. This prevents the reference beam transmitted through the plate 76 from producing a glare at the surface of the plate 76' facing the plate 76, thereby avoiding fogging of the film 78. Moreover, in order to prevent reference light from being transmitted into compartment B where the subject 12 is located, the lower mounting element 84 is provided with a light absorbing upper surface 98 dimensioned to substantially completely absorb the collimated diverged reference beam 56 passing through the glass plates 76,76' and the film 78 interposed therebetween.

As shown in FIGS. 1 and 5, the holographic sheet film 78 is supplied to the film holder 76,76' as a continuous length from a film cassette arranged in a light impervious box 100 located in compartment A above the filmholder. Conventional sheet film feeding means (not shown) are provided for sequentially feeding a predetermined length (e.g. 25 cm) of the sheet film 78 between the glass plates 76 and 76' when the plate 76 is in the film releasing position, the film 78 being fed through a light impervious upper passageway 102; access to the passageway 102 for film loading may be gained by opening the hinged door 104. Sheet film conveying means (not shown) are also arranged below the filmholder for withdrawing the predetermined length of film from between the glass plates 76,76' after exposure of the film. Located immediately below the filmholder is a sheet film cutting device 106 for cutting the length of exposed film thus withdrawn, the sheet film cutting device 106 being operative to cut the film 78 when the plate 76 is in the film engaging position. The cut length of exposed film 78' is conveyed through a light impervious lower passageway 108 to which access may be gained by opening the hinged door 110, and it is passed through a slot 112 leading to compartment C and into the film processing unit 44.

The film processing unit 44 is schematically illustrated in FIG. 6. As shown, the film processing unit 44 comprises three treatment baths 114, 116 and 118 and a final rinse section 120 which are arranged in tandem relation. The first bath 114 contains a developer for developing the exposed film 78'. After development, the film is passed over a partition element 122 and into the second bath 116 which is a stop bath for stopping the action of the developer. The film is then passed over another partition element 124 and into the third bath 118 which contains a bleach for bleaching the film. After bleaching, the film is passed over a further partition element 126 and into the rinse section 120 for thorough wash. The baths 114,116 and 118 are all maintained at a constant temperature of about 20° C. The baths 114,116,118 and rinse section 120 are dimensioned relative to one another to permit a 4 minute treatment in bath 114, and 30 second treatment in bath 116, a 2 minute treatment in bath 118 and a 2 minute wash in rinse section 120.

As shown in FIG. 1, the processed film is discharged from the processing unit 44 through a slot 128 into the film drying unit 46 where it is dried. The dried processed film is then passed into the film laminating unit 48 for lamination onto a black cardboard sheet with the emulsion side of the film facing the cardboard sheet, before being discharged through slot 130 into the outlet receptacle 132.

The operation of photograph booth 10 is as follows. The subject 12 having entered compartment B and sat on stool 40 feeds a required amount of money in a money receiving device (not shown) which automatically turns on the halogen lamps 74 and 74', thereby illuminating the subject 12 with intense white light through the diffusion screens 90 and 90'. The halogen lamps 74 and 74' are coupled with a timer (not shown) so as to illuminate the subject over a sufficient period of time (e.g. 30 seconds) to cause the pupils of the subject's eyes to contract to a size permitting safe illumination by pulsed laser radiation. The shutter members 80 and 80' then open for a period of about 1/1000 second, while the lamps 74 and 74' are turned off and the laser 32 is activated for generating the necessary pulsed laser light to thereby illuminate the subject 12 with diffuse object light through the diffusion screens 90 and 90', over a period of about 30 nanoseconds corresponding to the pulse duration of the pulsed laser light. Light reflected by the subject onto the film 78 interferes with the collimated diverged reference beam 56 striking the film 78 from behind the filmholder 76,76' to produce a holographic interference pattern which is recorded on the film. Thereafter, the shutter members 80 and 80' close, the glass plate 76 is moved to the film releasing position and the length of exposed film 78' is withdrawn from between the plates 76,76' and conveyed into the lower passageway 108, while a length of unexposed film 78 is fed between the plates 76,76'. The plate 76 is then moved to the film engaging position, and the length of exposed film 78' thus withdrawn is cut by means of the film cutting device 106. The cut length of exposed film is conveyed through the slot 112 into the film processing unit 44, for proper processing. The processed film is thereafter passed through slot 128 into the film drying unit 46 and then into the film laminating unit 48. The laminated holographic portrait of the subject 12 is finally discharged through slot 130 into the outlet receptacle 132.

As it is apparent, the photograph booth 10 enables holographic portraits of human subjects, which have a relatively large size (e. g. 20 cm×25 cm or 8"×10"), to be taken in a safe and entirely automatic manner.

I claim:
1. A photograph booth for providing a hologram of a human subject positioned inside the booth in facing relationship to a holographic sheet film on which the hologram of said subject is to be recorded, said booth comprising:
 a Q-switched laser source for generating a pulsed laser beam travelling along an optical path, said pulsed laser beam having a coherence length of at least about one meter and a pulse duration of about 20 to about 100 nanoseconds;
 beam splitting means arranged in the optical path of said laser beam for dividing said laser beam into a reference beam and at least one object beam;

sheet film holding means for supporting said holographic sheet film in a plane facing said subject;

a first optical system for diverging and guiding said reference beam toward said film;

a second optical system for diverging and guiding said at least one object beam toward said subject for illuminating same at an acute angle of incidence such as to cause light reflected by the subject onto the film to interfere with the diverged reference beam and thereby produce a holographic interference pattern;

white light source means operable prior to activaton of said laser source for illuminating said subject with white light of sufficient intensity and over a sufficient period of time to cause pupil contraction to a size permitting safe illumination of the subject by the diverged object beam;

shutter means synchronized with said laser source for exposing said film to said holographic interference pattern for a predetermined exposure time to record thereon said holographic interference pattern while substantially preventing stray light from reaching said film; and film processing means for developing the exposed film having said holographic interference pattern recorded thereon to provide a hologram representative of said human subject and viewable directly in white light.

2. A photograph booth as claimed in claim 1, wherein said laser source is a Q-switched ruby laser.

3. A photograph booth as claimed in claim 2, wherein said Q-switched ruby laser is operative to generate a pulsed laser beam having a coherence length of about one meter and a pulse duration of about 30 nanoseconds.

4. A photograph booth as claimed in claim 1, wherein said beam splitting means comprise a first beamsplitter for dividing said laser beam into said reference and object beams and a second beamsplitter for dividing the object beam into two object beam portions, said object beam portions being diverged and guided by said second optical system toward said subject for respectively illuminating the subject at an acute angle of incidence.

5. A photograph booth as claimed in claim 1, wherein said first and second optical systems are arranged to cause the diverged reference beam nd the light reflected from said subject to impinge on opposite sides of said film and to thereby provide a reflection hologram.

6. A photograph booth as claimed in claim 5, wherein a partition wall formed with an opening separates the booth into first and second contiguous compartments with said subject positioned in said second compartment, and wherein filmholder mounting means are provided for mounting said film holding means in spaced relation to said wall and in alignment with the opening thereof such that said mounting means together with said film holding means define a recess relative to said second compartment.

7. A photograph booth as claimed in claim 6, wherein said film holding means comprises first and second clamping plates of transparent material extending in opposite parallel relationship to one another for holding said film clamped therebetween, said first clamping plate receiving therethrough the diverged reference beam for transmission to said film.

8. A photograph booth as claimed in claim 7, wherein said second clamping plate is fixed and said first clamping plate is movable relative thereto between a film engaging position whereat said first clamping plate is moved toward said second clamping plate to hold said film thereagainst for exposure to said holographic interference pattern, and a film releasing position whereat said first clamping plate is moved away from said second clmping plate to release said film after exposure, plate actuating means being provided for moving said first clamping plate between said film engaging and releasing positions.

9. A photograph booth as claimed in claim 8, further including sheet film feeding means arranged above said film holding means for supplying thereto a continuous length of said sheet film, said sheet film feeding means being operative to sequentially feed a predetermined length of said sheet film between said first and second clamping plates when said first clamping plate is in said film releasing position, and sheet film conveying means and cutting means arranged below said film holding means for withdrawing said predetermined length of film from between said clamping plates after exposure of said film and for cutting the length of exposed film thus withdrawn, said sheet film cutting means being operative to cut said film when said first clamping plate is in said film engaging position.

10. A photograph booth as claimed in claim 9, wherein said film processing means are arranged in a third compartment below said second compartment, and wherein said sheet film conveying means and cutting means are arranged in a light impervious passageway disposed immediately below said film holding means and communicating with said third compartment, said sheet film conveying means further serving to convey the cut length of exposed film through said passageway to said film processing means.

11. A photograph booth as claimed in claim 10, further including sheet film drying means for drying the processed film, said sheet film drying means being arranged in a fourth compartment contiguous to said second and third compartments and communicating with said third compartment through a slot allowing passage of said film from said film processing means to said film drying means.

12. A photograph booth as claimed in claim 11, further including sheet film laminating means arranged in said fourth compartment for laminating the dried processed film on a black opaque support material, thereby providing a laminated hologram of said human subject, and means for discharging the laminated hologram exteriorly of the booth.

13. A photograph booth as claimed in claim 7, wherein said laser beam is polarized in a plane perpendicular to the plane of said film, and wherein the diverged reference beam impinges upon said first clamping plate at an angle of incidence substantially equal to Brewster angle.

14. A photograph booth as claimed in claim 13, wherein said first optical system includes reflection means positioned to direct the diverged reference beam downwardly onto said first clamping plate at said angle of incidence.

15. A photograph booth as claimed in claim 14, wherein said angle of incidence is approximately 55°.

16. A photograph booth as claimed in claim 14, wherein said first optical system further includes a beamspreader for diverging said reference beam, and wherein said reflection means comprises a collimating mirror for collimating the diverged reference beam downwardly toward said first clamping plate.

17. A photograph booth as claimed in claim 14, wherein said filmholder mounting means comprise a pair of upper and lower mounting elements and a pair of lateral mounting elements, said mounting elements extending from said partition wall into said first compartment and interconnecting said second clamping plate respectively along upper, lower and side edges thereof with said wall.

18. A photograph booth as claimed in claim 17, wherein said lower mounting element is provided with a light absorbing upper surface dimensioned to substantially completely absorb the diverged reference beam passing through said first and second clamping plates and said film interposed therebetween.

19. A photograph booth as claimed in claim 17, wherein said lateral mounting elements are each provided with a light diffusing screen extending at an oblique angle relative to said second clamping plate, and wherein said beam splitting means comprise a first beamsplitter for dividing said laser beam into said reference and object beams and a second beamsplitter for dividing the object beam into first and second object beam portions, said first and second object beam portion being diverged and guided by said second optical system to pass through said diffusing screens for illuminating said subject with diffuse light.

20. A photograph booth as claimed in claim 19, wherein said second beamsplitter is a 2:3 beamsplitter such that said first and second object beam portions have an intensity ratio of 2:3.

21. A photograph booth as claimed in claim 19, wherein said second optical system comprise first and second reflection means for reflecting respectively said first and second object beam portion to said diffusing screens, and first and second beamspreaders for diverging respectively the reflected first and second object beam portions.

22. A photograph booth as claimed in claim 19, wherein said white light source means comprise a pair of high intensity lamps arranged to direct a beam of white light through said diffusing screens.

23. A photograph booth as claimed in claim 22, wherein said high intesnity lamps are halogen lamps.

24. A photograph booth as claimed in claim 7, wherein said shutter means comprise first and second curtain-type shutter members arranged on either side of said film holding means, said first and second shutter members being synchronized with one another for synchronous opening or closing to provide said predetermined exposure time.

25. A photograph booth as claimed in claim 24, wherein a protective screen of high-impact transparent material covers the wall opening to prevent access to said film holding means and said shutter means from said second compartment.

26. A method of taking a holographic portrait of a human subject, which comprises the steps of:
(a) illuminating said subject with white light of sufficient intensity and over a sufficient period of time to cause pupil contraction to a size permitting safe illumination of the subject by pulsed laser radiation;
(b) activating a Q-switched laser source to generate a pulsed laser beam having a coherence length of at least about one meter and a pulse duration of about 20 to about 100 nanoseconds;
(c) dividing said laser beam onto a reference beam and at least one object beam;
(d) diverging and guiding said reference beam toward a holographic film supported in a plane facing said subject;
(e) diverging and guiding said at least one object beam toward said subject for illuminating same at an acute angle of incidence such as to cause light reflected by the subject onto the film to interfere with the diverged reference beam and thereby produce a holographic interference pattern; and
(f) exposing said film to said holographic interference pattern for a predetermined exposure time to record thereon said holographic interference pattern while substantially preventing stray light from reaching said film.

27. A method as claimed in claim 26, wherein said subject is illuminated with said white light for a period of about 30 seconds.

28. A method as claimed in claim 26, wherein said predetermined exposure time is about 1/1000 second.

29. A method as claimed in claim 26, further including the step of processing the exposed film having said holographic interference pattern recorded thereon to provide a hologram representative of said human subject and viewable directly in white light.

30. A method as claimed in claim 29, further including the step of laminating the processed film on a support material, thereby providing a laminated hologram of said human subject.

* * * * *